Sept. 21, 1954 W. E. BRADLEY 2,689,927

CATHODE-RAY TUBE AND SCREEN STRUCTURE THEREFOR

Filed Dec. 22, 1951

2 Sheets-Sheet 1

INVENTOR
WILLIAM E. BRADLEY
BY Allen V. Hazeltine
ATTORNEY

INVENTOR
WILLIAM E. BRADLEY
BY [signature]
ATTORNEY

Patented Sept. 21, 1954

2,689,927

UNITED STATES PATENT OFFICE 2,689,927

CATHODE-RAY TUBE AND SCREEN STRUCTURE THEREFOR

William E. Bradley, New Hope, Pa., assignor to Philco Corporation, Philadelphia, Pa., a corporation of Pennsylvania Application December 22, 1951, Serial No. 262,970

10 Claims. (Cl. 315—12)

The present invention relates to improvements in cathode ray tube screen structures and associated circuitry. More particularly it relates to improved means for indicating impingement of a cathode ray beam upon certain regions of such structures.

Cathode ray tubes equipped with beam position indicative, or "indexing" means have numerous applications. In color television receivers, for example, it has been proposed to reconstitute a televised image in full color by using a single receiver cathode ray tube whose screen is formed of minute elements, each emissive of light of one of three different primary colors such as red, green and blue. The beam is made to scan this screen and, when it impinges on a particular colored light emissive element, its intensity is controlled in accordance with the magnitude of the corresponding color component of light from the corresponding minute element of the televised scene. The inability of the human eye to resolve the minute, closely-spaced screen elements, and persistence of vision are then relied upon to create the subjective impression, in the observer of the screen structure, that a full-color image is being displayed thereon.

This desired effect will, of course, be achieved only if the beam impinges upon a screen element emissive of light of a particular color at the very instant at which its intensity is controlled in accordance with received signal information respecting that same color. Due to imperfections in the beam deflection circuits and/or variations in the rate of occurrence of items of received color information, the desired color registry cannot usually be assured by fixed initial adjustment of circuit components. Means have therefore been devised for monitoring color registry and for responding to departures therefrom to produce the necessary corrections. For this purpose, screen structures for color television receivers generally include the aforementioned indexing means, these being elements which are disposed in a predetermined geometrical configuration with respect to the light emissive elements of the screen structure and which are responsive to beam impingement differently than other regions of the screen structure. Knowing the relative disposition of colored light emissive elements and of indexing elements over the screen area, it is then possible to predict what the pattern of indexing indications will be under conditions of proper color degistry. Departures of the indexing indication pattern from this norm provide indications of color registry errors and may be used to modify either the rate of occurrence of items of received signal color information or the rate of beam deflection, or both, to the extent necessary to reestablish the desired condition of color registry. Suitable means for deriving and utilizing indexing indications to produce color registry have been described and claimed in the copending U. S. patent applications of Carlo V. Bocciarelli, Serial No. 198,709, filed December 1, 1950, and David E. Sunstein, Serial No. 185,106, filed September 15, 1950, and both assigned to the assignee of the present invention. However, it will be understood that the present invention is not restrictively associated with any particular system for deriving and utilizing these indexing indications, the aforementioned copending applications being referred to only as disclosing examples of this technique.

A phenomenon which is frequently relied upon to differentiate indexing elements from other portions of the screen structure is the difference in the total number of electrons emitted from different materials in response to electron beam impingement. The phosphors, of which the colored light emissive screen elements are made, generally emit a relatively small number of such electrons. The indexing elements are, therefore, frequently made of some material such as magnesium oxide, which is capable of emitting a much larger number of electrons than the phosphors, so that electron beam impingement on the magnesium oxide indexing elements is indicated by an increase in the current flowing to a collector for such screen emitted electrons.

It is well known that emission of electrons from materials impinged by an electron beam may occur at two widely separated velocities, one relatively high and one relatively low. The best theoretical explanation for this difference seems to be that electrons emitted at low velocities are electrons knocked out of the impinged material by the beam, while electrons emitted at high velocities are beam electrons reflected by strong electric field effects within the impinged materials. Of course, the validity of this theoretical explanation is immaterial, for my purposes. The fact remains that substantially all materials, and particularly all materials found suitable for screen construction, emit low velocity electrons to some extent.

As a result, indexing indications from cathode ray tube screens have heretofore commonly been produced, at least in part, by such low velocity electrons. Inasmuch as the beam sweeps across consecutive screen elements emissive of differently colored light in extremely rapid succession, it is imperative that indexing indications be produced with the utmost rapidity or the corrective circuits will not be able to correct registry errors quickly enough to prevent color distortion. It is now apparent that the production of indexing indications by prior art arrangements is delayed to the extent that the indexing indication is produced by low velocity electrons. This is the case whether indexing indications are derived from the screen itself, or from the collector electrode for screen emitted electrons. In the first case, electrons emitted at low velocities will remain in the vicinity of the screen for a relatively long time during which they will make their proximity felt in the index output circuit just as though they had not left the screen at all. In the second case, their arrival at the collector electrode and their production of an indication in its output circuit will be delayed by the relatively long time which they spend in transit between the screen and the collector.

Some materials, such as magnesium oxide, which are very commonly used for indexing purposes because of their large total number of emitted electrons, emit low velocity electrons almost exclusively and therefore give relatively poor performance with respect to rapidity of production of indexing indications.

Furthermore, materials which emit only low velocity electrons give rise to an additional restriction on the construction of the receiver tube, for such low velocity electrons are generally unable to traverse even a thin aluminum film and, in arrangements using such materials, it was necessary either to omit the light-reflecting aluminum film often applied to the beam confronting screen surface to increase its useful light emission, or to suffer prohibitive reduction in the strength of the indexing indications.

It is, accordingly, a primary object of the invention to provide an improved indexing system for cathode ray tubes.

It is another object of the invention to provide an improved indexing system for cathode ray tubes utilizing certain heretofore ignored differences in electron emission from different portions of the tube screen structure.

It is still another object of the invention to provide an improved indexing system for cathode ray tubes wherein delays in the production of indexing indications due to electron velocities are substantially reduced.

It is a still further object of the invention to provide an improved indexing system for cathode ray tubes utilizing screen electron emission to produce indexing indications and yet permitting aluminum filming of the screen.

It is a feature of the invention that the aluminum film, which may be deposited on the electron beam confronting surface of the screen, not only will not affect adversely the operation of the system but may actually cooperate with other elements of the system to simplify its construction and improve the quality of index signals produced.

I have found that these objectives can be realized by deriving indexing indications, not from the total screen electron emission as heretofore, but only from the high velocity electrons emitted by the screen. For this purpose, I form my indexing elements of materials emissive of relatively large numbers of such high velocity electrons and I form the non-indexing portions of the screen of materials emissive of relatively small numbers of such high velocity electrons. Both the indexing elements and the non-indexing portions may be chosen without regard to their total relative electron emissivities, for I provide additional means for deriving useful indications only from the high velocity electrons.

The particular manner in which apparatus embodying my invention is constructed and arranged will be apparent from the following discussion taken in conjunction with the accompanying drawings wherein.

Figure 1:
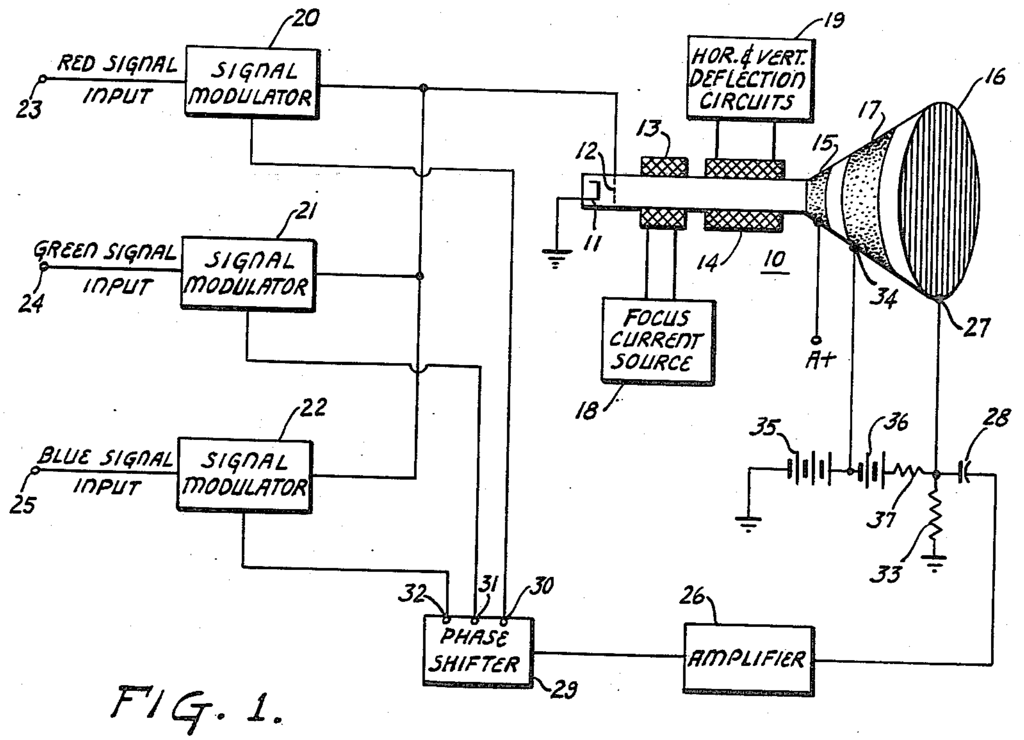
Figure 1 shows a cathode ray tube and associated circuits embodying my invention, together with such components of a color television receiver as cooperate intimately therewith.

In Figure 1 of the drawings, to which more particular reference may now be had, there is illustrated a cathode ray tube 10 which includes many conventional elements such as electron emissive cathode 11, electron beam intensity control grid 12, focus coil 13, horizontal and vertical deflection coils 14 and accelerating anode 15. In fact, with the exception of its screen 16 and its collector electrode 17, all the elements of this cathode ray tube may be entirely conventional and, accordingly, do not require detailed description here. There is also provided a conventional source of focus current 18 which is connected to focus coil 13 for the purpose of causing the beam to impinge upon the screen 16 in a small region or spot. Deflection coils 14 are connected to conventional horizontal and vertical deflection circuits 19 and operate to deflect the beam repetitively across the cathode ray tube screen so as to trace thereon a conventional raster. The accelerating anode 15 may take the form of a deposit of conductive carbon particles encircling the inside of the flared portion of the cathode ray tube envelope. This anode is preferably near, but spaced and insulated from, the screen and connected to a conventional source of anode potential A+. The beam intensity control grid 12 is connected to three signal modulators 20, 21 and 22 which are, in turn, connected to signal input terminals 23, 24 and 25, respectively. Screen structure 16 is connected to an amplifier 26 by way of a connection 27 made to the screen structure 16 in a manner hereinafter explained and by way of D.-C. blocking capacitor 28, the output of the amplifier 26 being in turn connected to a phase shifter 29. The latter is provided with three output terminals, designated 30, 31 and 32 and respectively connected to input circuits of signal modulators 20, 21 and 22. By way of the same connection 27, the screen structure 16 is also connected through a load resistor 33 to ground. The collector electrode 17, which may take the form of a coating of conductive material disposed on the inside of the flared portion of the cathode ray tube envelope intermediate the second anode 15 and the screen structure 16 and isolated from both, is connected, through a connection 34, to a source of positive potential as represented by battery 35. For reasons which will be discussed more fully hereinafter, the collector electrode 17 is preferably maintained at a predetermined negative potential relative to the screen structure 16 by means of a source of unidirectional potential 36 interconnecting these elements through a current limiting resistor 37. While sources 35 and 36 of unidirectional potential have been illustrated as batteries, it will be understood that any one of a variety of conventional voltage supplies may be substituted therefor.

In operation, a beam of electrons is emitted from cathode 11, focused by coil 13 and projected toward the screen by accelerating anode 15. The deflection coils 14 produce repetitive deflection of this beam across the screen so as to form, in the conventional arrangement, spaced horizontal scanning lines thereon. The intensity of this beam of electrons iis controlled by the vdeo signal applied to grid 12 from signal modulators 20, 21 and 22.

For this purpose, color signal input terminals 23, 24 and 25 are supplied from a television receiver with separate signals indicative of red, green and blue color components of the televised scene, respectively, which signals preferably have had their D.-C. components restored. The system then operates to modulate three sine waves in accordance with these three signals, the sine waves being mutually phase displaced in such a manner that first the wave modulated with the red video signal reaches its peak, then the wave modulated with the green video signal and finally the wave modulated with the blue video signal. By virtue of this arrangement, the red video signal first controls the beam intensity of grid 12, then the green signal, and then the blue signal, then again the red signal and so on in recurrent sequence. The particular manner in which this modulation may be effected and controlled is explained in detail hereinafter. First, however, the details of construction which enable the screen to reproduce this color information in visible form must be considered.

Figure 2:
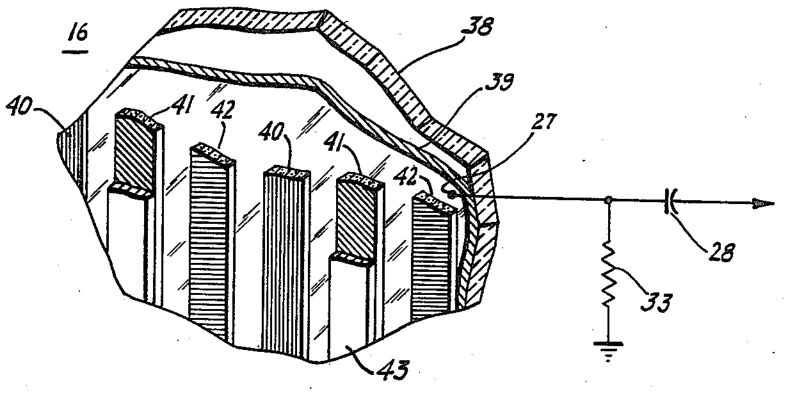
Figure 2 shows, by means of a greatly enlarged fragmentary view, details of the screen structure of the cathode ray tube of Figure 1.

These are all illustrated in Figure 2 of the drawings to which more particular reference may now be had. As shown therein, screen 16 is comprised of a substrate 38, made of a solid transparent material, such as glass, upon which there is preferably deposited a thin film 39 of some electrically conductive transparent material such as stannic oxide. On the electron beam confronting side of this film, there are additionally deposited a number of narrow strips 40, 41 and 42 extending vertically across the screen surface. These strips are made of such materials that strips 40 are responsive to electron beam impingement to emit red light, while strips 41 and 42 are made to be emissive of green and blue light respectively, under the same stimulus. It will be readily understood that it is desirable, in the interest of fidelity of color reproduction, that light of the different component colors representative of a given picture element emanate, as nearly as possible, from the same region of the screen area. Therefore, it is the usual practice to make one strip of a phosphor which emits light of one of the primary colors, while making the two adjacent strips of phosphors which emit light of the other two colors, respectively. This consideration, together with the order of occurrence of color representative signal portions produced by the modulating sequence determines the order in which the colored light emissive strips are deposited to form the screen structure. Particular phosphors useful for these applications are well known in the art. For example zinc phosphate may be used for the red light emissive strips, zinc orthosilicate for the green light emissive strips and calcium magnesium silicate for the blue light emissive strips.

Upon every third one of these phosphor strips, as for example upon each strip designated 41, there may be additionally deposited a strip 43 made of a material responsive to electron impingement to emit high velocity electrons in numbers large compared to the numbers of such electrons emitted by the materials of strips 40 and 42. In general, the number of high velocity electrons which substances emit increases with increasing atomic weight. Since the light emissive phosphor strips are commonly made of low atomic weight materials which emit negligibly small numbers of such high velocity electrons in response to electron beam impingement, one or more of a wide variety of materials, all characterized by their high atomic weights, relative to those of the phosphors, are suitable for use as the material of which strips 43 are constituted. Particularly useful in this respect are the heavy metals tungsten, silver and gold, because these materials are not only strongly emissive of high velocity electrons but are quite stable and do not tend to react with the phosphor on which they may be deposited so as to affect adversely the light emissive properties of the latter. It will be understood that, in practice, the strips 43 extend preferably throughout the entire length of strips 41. In Figure 2, they have been shown broken away only to permit observation of the underlying strips 41 which they would otherwise obscure.

It will also be understood that the number of strips normally constituting a practical screen structure is much greater than that illustrated, the reduction of number having been made to permit enlarged and clearer illustration of the constructional details. In practice, a cathode ray tube having a useful screen diameter of 16 inches may have a total of roughly 1200 different phosphor strips in its screen structure.

The electrical connection 27, to which reference was made in the description of Figure 1, terminates at the conductive coating 39, which serves to maintain equal potential over all areas of the screen surface. In operation, the cathode ray beam generated by cathode 11 and accelerated by anode 15 will be repetitvely deflected from left to right across the cathode ray tube screen structure 16 by means of the aforementioned deflection coils 14 to form a conventional scanning raster. As the beam is so deflected, it will successively impinge upon different ones of the aforesaid light emissive strips 40, 41 and 42. Whenever the beam impinges upon any strip 40 or 42, the material of which the strip is made will respond not only by producing appropriately colored visible light but also by emitting a number of low velocity or "secondary" electrons. As hereinbefore indicated, there will be little, if any, emission of high velocity, or reflected primary electrons from these strips 40 and 42. The source of unidirectional potential 36, included in the connection from the screen structure 16 to the collector electrode 17 is chosen to maintain a difference in potential between these electrodes sufficient to prevent impingement of substantial numbers of these low velocity electrons upon collector electrode 17. In fact, by making this potential difference suitably large and thereby making the electrode 17 sufficiently negative with respect to the screen structure 16, any substantial emission of such low velocity electrons from the screen structure and particularly from strips 40 and 42 may be inhibited. Note that this negative bias on the collector electrode or, at least, the absence of positive bias is an important distinguishing characteristic of my invention, as prior art systems relying on low velocity electrons have of necessity employed positively biased collectors. As the beam travels from a strip 42 to an adjacent strip 40 there will be no change in the current flowing through output resistor 33 from this cause. On the other hand, as the electron beam travels across a strip 41 bearing an indexing strip 43, the material of which the latter is composed will respond by emitting a relatively large number of high velocity electrons, in addition to any low velocity electrons which may tend to be emitted by the same material or by the underlying strip 41. The source of unidirectional potential 36, and with it the negative bias of collector electrode 17, is preferably so chosen that these high velocity electrons will be able to reach the electrode 17 in spite of the negative, or retarding field between the screen structure and the electrode. As a result, there will be a fluctuation in the current flowing through output resistor 33, and a variation in the potential across it whenever the cathode ray beam sweeps across an indexing element 43. This variation in potential is transmitted through capacitor 28 and constitutes the indexing signal of the system. After passage through capacitor 28, this indexing signal is supplied to amplifier 26 and thence to phase shifter 29. This phase shifter is so arranged that, upon being supplied with an indexing signal which is indicative of beam impingement upon a green strip 41, it will produce the aforementioned three sine wave signals at terminals 30, 31 and 32 respectively, and so phased with respect to the indexing signal as to peak at the times when the beam will be impingent upon correspondingly colored strips 40, 41 and 42 respectively. These signals are then supplied, through the previously mentioned connections to the signal modulators where their amplitudes are controlled by the three different color signals as hereinbefore explained. In practice, each modulator may comprise a multi-grid vacuum tube to one of whose grids the appropriate color signal is continuously applied while its other grid is supplied with the appropriately phased sine wave from phase shifter 29.

Thus, it is seen that the entire indexing system, cooperating with the screen structure embodying my invention, operates as a servo system, beam impingement upon indexing elements of the screen structure assuring the appropriate supply of color information to the cathode ray tube grid for the maintenance of accurate color reproduction. As has been pointed out, the particular means for effecting this control are immaterial for the purposes of my invention, the practical modulator arrangement herein described having been selected only for illustrative purposes. It is important to note, however, that the negative bias of the collector electrode 17 with respect to the screen structure 16 has the effect of preventing low velocity electrons emitted from the screen structure fror reaching the collector electrode 17 while permitting the latter to collect high velocity electrons emitted from the indexing elements. Consequently, indexing indications will be produced in the system only by high velocity electrons and these indexing indications will therefore follow the impingement of the electron beam upon the indexing elements by a much smaller time interval than was the case heretofore when low velocity electrons were used.

While one of the principal advantages of the invention, as illustrated in the Figures 1 and 2 above described, is its elimination of delay in the production of indexing indications due to transit time effects, there are other advantages which also obtain and which will now be discussed. As hereinbefore mentioned, in prior art tubes employing low velocity secondary electrons to produce indexing signals, it is unfeasible to interpose an aluminum film between the electron emissive material and the source of the electron beam for the purpose of enhancing the light output of the tube since even a thin film of aluminum will so impede the flow of low velocity secondary electrons as to prevent the realization of any satisfactory indexing signal. This difficulty has been overcome in prior art devices by interposing the aluminum film between the layer of phosphor strips and the electron emissive elements but this solution is not altogether satisfactory since it introduces the further difficulty of insuring proper alignment or registry between the indexing elements and the phosphor strips. By the present invention both of these difficulties are overcome and an aluminum film may be interposed between the indexing elements and the source of the electron beam without adversely affecting the quality of the indexing signals produced. This is by virtue of the fact that although the flow of low velocity secondary electrons from the screen to the collecting electrode is substantially impeded by the interposition of an aluminum film, such a film is of no substantial effect in impeding the flow of high velocity electrons reflected from the screen. In fact, in an embodiment of the present invention, the quality of the index signal produced is substantially enhanced by the interposition of an aluminum film between the source of high velocity electrons and the collector electrode because of the fact that the undesired low velocity secondary electrons are thereby prevented from reaching the collector electrode and diluting the desired index signal. Such an embodiment will now be described with reference to Figures 3 and 4.

Figure 3:
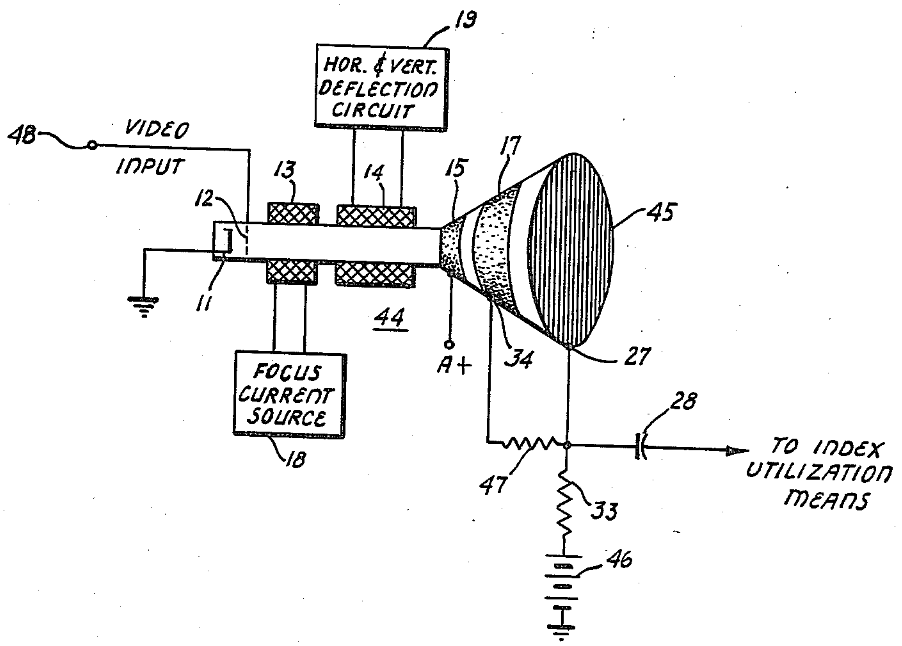
Figure 3 shows another embodiment of my invention including a cathode ray tube and associated circuits.

There is illustrated in Figure 3, to which more particular reference may now be had, a cathode ray tube 44. With the exception of its screen structure 45, it is similar to cathode ray tube 10 of Figure 1 in its constructional details. Similar portions of the two cathode ray tubes have therefore been designated by the same reference numerals. Thus, cathode ray tube 44 is seen to comprise an electron emissive cathode 11, a beam intensity control grid 12, a focusing coil 13, horizontal and vertical deflection coils 14, accelerating anode 15 and collector electrode 17. Conductive connection from outside the tube envelope is again provided to the collector electrode by terminal 34 and to the screen structure by terminal 27. Focus coil 13 is again supplied with focus current from a source 18 similar to the similarly designated source of focus current of Figure 1. Likewise, conventional horizontal and vertical deflection circuits 19 are used to operate deflection coils 14 so as to deflect the electron beam repetitively across the screen structure to form a conventional scanning raster thereon. A conventional source of unidirectional anode potential A+ is again connected to accelerating anode 15. An output coupling capacitor 28 is also connected to terminal 27, as is also an output resistor 33 through which the screen is connected to the positive terminal of a source of unidirectional potential 46 whose negative terminal is grounded. Unlike the arrangement of Figure 1, the circuit connecting terminal 27 to terminal 34 of the collector electrode now includes no sources of potential but only a resistor 47 whose function will become apparent hereinafter. The explanation of how this system operates, in accordance with the invention, to produce indexing indications for transmission to external circuits by coupling capacitor 28 requires prior detailed description of the arrangement of the screen structure. Before proceeding to this description, however, attention is called to the fact that the indexing signals produced at the screen terminal 27 and transmitted through coupling capacitor 28 may be utilized, in exactly the same manner as were the indexing signals produced by the system of Figure 1, to control the times of application of video information to the beam intensity control grid 12 of the cathode ray tube. Since the circuits used for this purpose may be identical in both arrangements, and since these circuits, furthermore, form no part of my invention, their illustration has not been repeated in Figure 3. Instead, it has been generally indicated that coupling capacitor 28 serves to connect the screen terminal 27 to index utilization means, of whatever type they may be. A video input terminal 48 has also been shown connected to beam intensity control grid 12, it being immaterial for the purposes of my invention just how the index signals produced by the system including the screen structure, the collector electrode and associated circuits are utilized to control the production of the appropriate video input signals.

Figure 4:
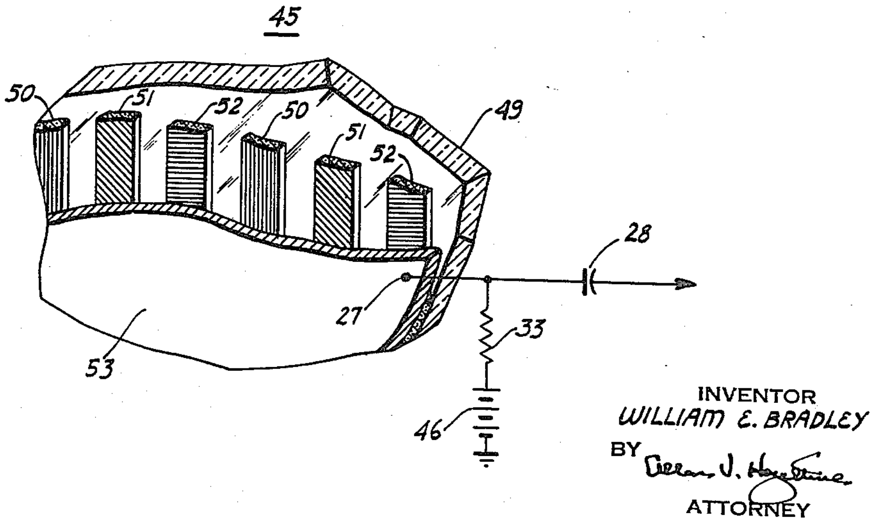
Figure 4 shows, by means of a greatly enlarged fragmentary view, details of the screen structure of the cathode ray tube of Figure 3.

In Figure 4 of the drawings, to which more particular reference may now be had, there is illustrated in detail the screen structure 45 of the cathode ray tube 44 of Figure 2. This screen structure comprises a substrate 49 of a solid transparent material such as glass. Upon this substrate 49 there is now directly deposited a plurality of vertically elongated phosphor strips 50, 51 and 52, recurrently disposed across the substrate. Of these, strips 50 may be made of a phosphor emissive of red light in response to electron beam impingement, while strips 51 may be made of a phosphor emissive of green light and strips 52 of a phosphor emissive of blue light, in response to electron impingement. Note that, unlike the screen structure of Figures 1 and 2, the screen structure of Figure 4 employs no conductive coating between the glass substrate and the phosphor strips. The desired equipotential relation between different portions of the screen structure is instead maintained by the aluminum film 53 deposited on top of the phosphor strips.

In this embodiment, the functions of the separate indexing elements of the screen structure 16 of Figures 1 and 2 are performed by certain of the phosphor strips themselves. To this end, there may be incorporated in each strip 51 emissive of green light, for example, a sufficient amount of a material emissive of a large number of high velocity electrons to make the net effective high velocity electron emissivity of the green strips substantially larger than that of the red and blue light emissive phosphor strips and of the aluminum film 53. The advantages of this incorporation of indexing material directly into certain of the phosphor strips are treated in detail in the copending application of Meier Sadowsky and Richard E. Waggener, Serial No. 246,690, filed September 14, 1951, and assigned to the assignee of the present invention. Briefly, this incorporation of the indexing material into the phosphor strips proper eliminates the problem of maintaining accurate registry between the indexing portions of the screen structure and certain light emissive portions thereof. Furthermore, the cathode ray beam is now no longer required to traverse an indexing element prior to impingement upon the phosphor strip located directly beneath it, so that the intensity of the beam reaching this phosphor strip is no longer deleteriously attenuated.

In any event, it will now be clear that if the material incorporated in the phosphor strip for indexing purposes were emissive principally of low velocity electrons, then these electrons would have no opportunity at all to produce indexing indications, for they could not penetrate the aluminum film deposited on top of the phosphor strips. When, however, in accordance with the invention, the material incorporated in the phosphor strips is strongly emissive of high velocity electrons, then the aluminum film, rather than impeding the production of indexing indications, assists it by intercepting low velocity electrons emitted from those same strips, as well as from other portions of the fluorescent screen structure, so that no contamination of the indexing indication by such low velocity electrons can occur. The extremely thin aluminum film is, of course, ineffective to prevent the passage of the high velocity emitted electrons. These latter will therefore, reach the collector electrode 17 and produce indexing indications which can be derived either from the screen structure or from this collector electrode. In the arrangement illustrated in Figure 4, passage of the electron beam across a strip 51 emissive of high velocity electrons will produce a fluctuation in the potential across output resistor 33 which will be transmitted as an indexing indication through coupling capacitor 28 to suitable index utilization means.

Note that this arrangement will ordinarily require no negative biasing of the collector electrode with respect to the screen, first because the separation of high velocity and low velocity electrons from the phosphor strips is effected by the aluminum film on the screen structure, and secondly because the arrival of high velocity electrons at the collector electrode 17 produces a potential drop across resistor 47 which tends to maintain the collector electrode negative relative to the screen structure. This latter effect prevents low velocity secondary electrons emitted by the aluminum layer from reaching the collector electrode. Consequently, this arrangement can ordinarily dispense with a separate source of negative collector bias potential. However, should this self-biasing effect be insufficient to prevent all low velocity electrons from reaching the collector electrode, then an additional source of unidirectional bias potential may, of course, be provided in the path between the screen structure and the collector electrode in the manner shown in Figure 1.

It will be understood that the choice of materials to be incorporated in the phosphor strips for indexing purposes is wide and is governed by essentially the same considerations as was the choice of materials for separate indexing elements. Thus, high atomic weight materials like tungsten, silver and gold, which are strongly emissive of high velocity electrons and which do not react with the phosphors, are all suitable. These materials are all preferably mechanically mixed with a phosphor in finely divided form prior to deposition of the phosphor on the face plate. Deposition of the mixture may then be carried out by any one of the standard techniques, such as silk-screening, settling or spraying, as fully discussed in the aforementioned Sadowsky and Waggener application.

From a consideration of the foregoing embodiments it will be apparent that numerous modifications thereof may be made by those skilled in the art without departing from my inventive concept. Accordingly, I desire the scope of the invention to be limited only by the appended claims.

I claim:

1. In combination: a cathode ray tube including a fluorescent screen structure, a source of an electron beam, and means for impinging said beam on said structure, said screen structure comprising a first portion constituted of materials responsive to electron beam impingement to emit low velocity electrons and a relatively small number of high velocity electrons and said screen structure also comprising a second portion constituted of materials responsive to electron beam impingement to emit a relatively large number of high velocity electrons; and means cooperating with said screen structure to collect high velocity secondary electrons emitted therefrom and to reject low velocity secondary electrons emitted therefrom.

2. In combination: a cathode ray tube including a fluorescent screen structure, a source of an electron beam, and means for impinging said beam on said screen structure, said screen structure comprising a first portion constituted of materials responsive to electron beam impingement to emit low velocity electrons and a relatively small number of high velocity electrons and said screen structure also comprising a second portion constituted of materials responsive to electron beam impingement to emit a relatively large number of high velocity electrons; means cooperating with said screen structure to collect electrons emitted therefrom; and means interposed between said screen structure and said collector means for intercepting low velocity electrons emitted from said screen structure.

3. In combination: a cathode ray tube including a fluorescent screen structure, a source of an electron beam, and means for impinging said beam on said screen structure, said screen structure comprising a first portion constituted of materials responsive to electron beam impingement to emit low velocity electrons and a relatively small number of high velocity electrons and said screen structure also comprising a second portion constituted of materials responsive to electron beam impingement to emit a relatively large number of high velocity electrons; means cooperating with said screen structure to collect electrons emitted therefrom; and a conductive film interposed between said screen structure and said collector means, in conductive contact with both said portions of said screen structure, to intercept low velocity electrons emitted from said screen structure.

4. In combination: a cathode ray tube including a fluorescent screen structure, a source of an electron beam, and means for impinging said beam on said screen structure, said screen structure comprising a first portion constituted of materials responsive to electron beam impingement to emit low velocity electrons and a relatively small number of high velocity electrons and said screen structure also comprising a second portion constituted of materials responsive to electron beam impingement to emit a relatively large number of high velocity electrons; means cooperating with said screen structure to collect electrons emitted therefrom; and means for establishing an electric field between said screen structure and said collector means, said field having such polarity and intensity as to prevent said low velocity electrons from reaching said collector means while permitting said high velocity electrons to reach said collector means.

5. In combination: a cathode ray tube including a fluorescent screen structure, a source of an electron beam, and means for impinging said beam on said screen structure, said screen structure comprising a first portion constituted of phosphors responsive to electron beam impingement to emit low velocity electrons and a relatively small number of high velocity electrons and said screen structure also comprising a second portion constituted of phosphors and of materials responsive to electron beam impingement to emit a relatively large number of high velocity electrons; means cooperating with said screen structure to collect electrons emitted therefrom; and means for impeding the flow of low velocity electrons from said screen structure to said collecting means.

6. In combination: a cathode ray tube including a fluorescent screen structure, a source of an electron beam, and means for impinging said beam on said screen structure, said screen structure comprising a first portion constituted of materials of relatively low atomic weight responsive to electron beam impingement to emit low velocity electrons and a relatively small number of high velocity electrons and said screen structure also comprising a second portion constituted of materials including a material of relatively high atomic weight responsive to electron beam impingement to emit a relatively large number of high velocity electrons; means cooperating with said screen structure to collect electrons emitted therefrom; and means for impeding the flow of low velocity electrons from said screen structure to said collector means.

7. In combination: a cathode ray tube including a fluorescent screen structure, a source of an electron beam, and means for impinging said beam on said screen structure, said screen structure comprising a first portion constituted of materials responsive to electron beam impingement to emit low velocity electrons and a relatively small number of high velocity electrons and said screen structure also comprising a second portion constituted of materials including a material responsive to electron beam impingement to emit a relatively large number of high velocity electrons, said last-named material being selected from the group consisting of silver, tungsten and gold; means cooperating with said screen structure to collect electrons emitted therefrom; and means for impeding the flow of low velocity electrons from said screen structure to said collector means.

8. In combination: a cathode ray tube including a fluorescent screen structure, a source of an electron beam, and means for impinging said beam on said screen structure, said screen structure comprising a first portion constituted of phosphors responsive to electron beam impingement to emit low velocity electrons and a relatively small number of high velocity electrons and said screen structure also comprising a second portion constituted of phosphors and of tungsten responsive to electron beam impingement to emit a relatively large number of high velocity electrons; means cooperating with said screen structure to collect electrons emitted therefrom; and means for impeding the flow of low velocity electrons from said screen structure to said collector means.

9. In a cathode ray tube: a screen structure comprising first and second portions respectively including phosphor materials responsive to electron impingement to emit light of different colors, said portions being responsive to electron impingement to emit secondary electrons with velocities predominantly below a predetermined value and said portions being also responsive to electron impingement to reflect substantially different fractions of the impinging electrons predominantly with velocities approximating their velocites of impingement; means for impinging electrons upon each of said portions with velocities substantially in excess of said predetermined value; and a conductive film disposed in contact with the electron impinged sides of both said portions and constructed and arranged to intercept electrons impinging thereon with velocities below said predetermined value, while permitting passage of electrons with velocities in excess of said predetermined value.

10. In a cathode ray tube: a screen structure comprising first and second portions respectively including phosphor materials responsive to electron impingement to emit light of different colors, said portions being responsive to electron impingement to emit secondary electrons with velocities predominantly below a predetermined value and said portions being also responsive to electron impingement to reflect substantially different fractions of the impinging electrons predominantly with velocities approximating their velocities of impingement; means for impinging electrons upon each of said portions with velocities substantially in excess of said predetermined value; and a conductive film disposed on the electron impinged sides of both said portions, said film being of such thickness as to impede the passage therethrough of electrons having velocities below said predetermined value, while permitting substantially unimpeded passage of electrons having velocities in excess of said predetermined value.

References Cited in the file of this patent

UNITED STATES PATENTS

| Number | Name | Date |
|---|---|---|
| 2,250,528 | Gray | July 29, 1941 |
| 2,343,825 | Wilson | Mar. 7, 1944 |
| 2,446,440 | Swedlund | Aug. 3, 1948 |
| 2,540,635 | Steier | Feb. 6, 1951 |
| 2,545,325 | Weimer | Mar. 13, 1951 |
| 2,548,118 | Morton et al. | Apr. 10, 1951 |
| 2,630,548 | Muller | Mar. 3, 1953 |
| 2,631,259 | Nicoll | Mar. 10, 1953 |
| 2,633,547 | Law | Mar. 31, 1953 |
| 2,634,325 | Bond et al. | Apr. 7, 1953 |